(12) United States Patent
Arunmozhi et al.

(10) Patent No.: US 11,453,018 B2
(45) Date of Patent: Sep. 27, 2022

(54) SENSOR ASSEMBLY WITH MOVABLE NOZZLE

(71) Applicant: Ford Global Technologies, LLC, Dearborn, MI (US)

(72) Inventors: Ashwin Arunmozhi, Canton, MI (US); Michael Robertson, Jr., Livonia, MI (US); Tyler D. Hamilton, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 641 days.

(21) Appl. No.: 16/442,682

(22) Filed: Jun. 17, 2019

(65) Prior Publication Data

US 2020/0391231 A1 Dec. 17, 2020

(51) Int. Cl.
*B05B 3/02* (2006.01)
*F16L 27/02* (2006.01)
*G02B 27/00* (2006.01)
*B60S 1/52* (2006.01)
*B60S 1/56* (2006.01)
*B05B 13/04* (2006.01)

(52) U.S. Cl.
CPC ............ *B05B 3/02* (2013.01); *F16L 27/023* (2013.01); *G02B 27/0006* (2013.01); *B05B 13/0405* (2013.01); *B05B 13/0421* (2013.01); *B60S 1/528* (2013.01); *B60S 1/56* (2013.01)

(58) Field of Classification Search
CPC ............ G02B 27/0006; B05B 3/00–18; B05B 13/0405–0426; B05B 13/0431
See application file for complete search history.

(56) References Cited

U.S. PATENT DOCUMENTS

| | | | |
|---|---|---|---|
| 3,127,116 A * | 3/1964 | Pollock | B60T 17/226 239/284.2 |
| 5,269,464 A | 12/1993 | Epple et al. | |
| 5,402,936 A * | 4/1995 | Hammelmann | B05B 3/02 239/263.1 |
| 5,657,929 A | 8/1997 | DeWitt et al. | |
| 6,905,078 B1 | 6/2005 | Gattuso et al. | |
| 7,434,748 B2 | 10/2008 | Takada et al. | |
| 8,596,554 B2 | 12/2013 | Litvinov et al. | |
| 9,452,739 B2 | 9/2016 | Kikuta et al. | |
| 10,183,653 B2 | 1/2019 | Davies et al. | |
| 2005/0121539 A1* | 6/2005 | Takada | B60S 1/52 239/284.2 |

(Continued)

FOREIGN PATENT DOCUMENTS

| | | | | |
|---|---|---|---|---|
| CN | 108216130 A | * | 6/2018 | |
| CN | 108973948 A | * | 12/2018 | ............ B05B 1/3033 |

(Continued)

*Primary Examiner* — Spencer E. Bell
*Assistant Examiner* — Omar Chaudhri
(74) *Attorney, Agent, or Firm* — Frank A. MacKenzie; Bejin Bieneman PLC

(57) ABSTRACT

A sensor assembly includes a first sensor window defining a first plane, a second sensor window fixed relative to the first sensor window and defining a second plane different than the first plane, and a nozzle positioned to deliver fluid to the first and second sensor windows. The nozzle is translatable along a first axis, rotatable about the first axis, and rotatable about a second axis transverse to the first axis.

20 Claims, 5 Drawing Sheets

(56) References Cited

U.S. PATENT DOCUMENTS

| | | | |
|---|---|---|---|
| 2006/0038038 A1* | 2/2006 | Hagiwara | B60S 1/528 239/284.1 |
| 2016/0244028 A1* | 8/2016 | Wakatsuki | B60S 1/62 |
| 2018/0029566 A1* | 2/2018 | Gopalan | B05B 1/10 |
| 2018/0339318 A1* | 11/2018 | DesOrmeaux | B08B 3/02 |
| 2019/0092286 A1* | 3/2019 | Henn | B08B 3/024 |
| 2019/0248338 A1* | 8/2019 | Singer | B60W 50/085 |
| 2020/0108801 A1* | 4/2020 | Frederick | B25J 5/02 |
| 2020/0171998 A1* | 6/2020 | Kondo | B60Q 1/0017 |
| 2020/0180567 A1* | 6/2020 | Sakai | B60S 1/528 |
| 2021/0387597 A1* | 12/2021 | Trebouet | B08B 5/02 |
| 2021/0387598 A1* | 12/2021 | Trebouet | B60S 1/566 |
| 2022/0001841 A1* | 1/2022 | Bialetzki | F04B 19/04 |

FOREIGN PATENT DOCUMENTS

| | | | | |
|---|---|---|---|---|
| DE | 102007014750 A1 * | 10/2008 | | B60S 1/528 |
| DE | 102012004815 A1 * | 9/2013 | | B05B 3/066 |
| EP | 0102306 A2 * | 3/1984 | | |
| FR | 2684342 A1 * | 6/1993 | | B60S 1/528 |
| KR | 200151413 Y1 * | 10/1998 | | |
| WO | 201720256 A1 | 11/2017 | | |

\* cited by examiner

SENSOR ASSEMBLY WITH MOVABLE NOZZLE

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
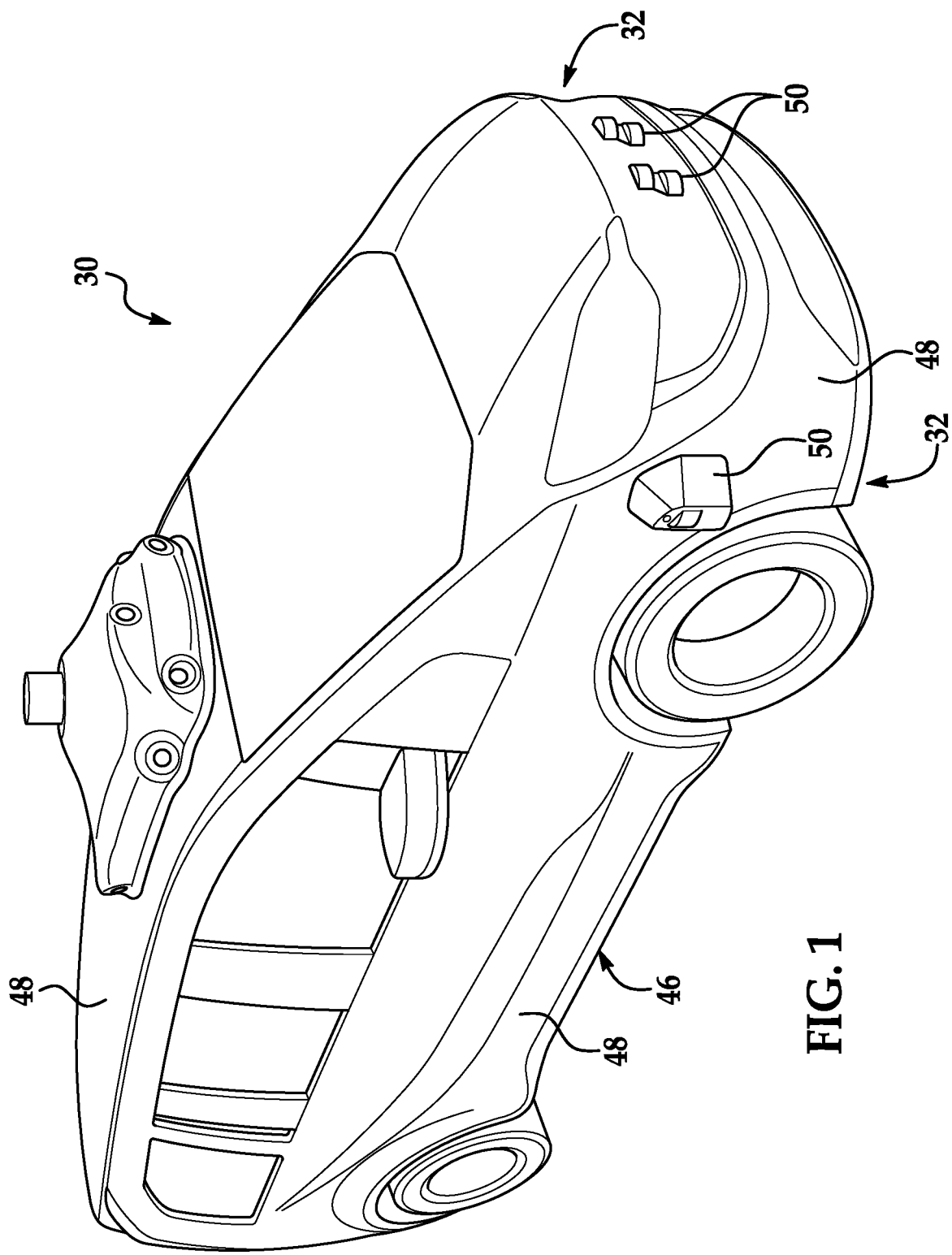
FIG. 1 is a perspective view of an example vehicle.

A sensor assembly includes a first sensor window defining a first plane, a second sensor window fixed relative to the first sensor window and defining a second plane different than the first plane, and a nozzle positioned to deliver fluid to the first and second sensor windows. The nozzle is translatable along a first axis, rotatable about the first axis, and rotatable about a second axis transverse to the first axis.

The nozzle may include an outlet oriented at an acute angle with the first axis in a direction along the first axis toward the first sensor window. The first sensor window may include a first zone and a second zone farther from the nozzle than the first zone, and the nozzle may be translatable along the first axis between a first position at which the outlet is aimed at the first zone and a second position at which the outlet is aimed at the second zone. The sensor assembly may further include a computer communicatively coupled to the nozzle, and the computer may be programmed to, in response to data indicating an obstruction of the first zone, translate the nozzle along the first axis to the first position. The computer may be further programmed to, in response to data indicating an obstruction of the second zone, translate the nozzle along the first axis to the second position.

The nozzle may be rotatable about the second axis between a first position at which the outlet is aimed at the first sensor window and a second position at which the outlet is aimed at the second sensor window. The sensor assembly may further include a computer communicatively coupled to the nozzle, and the computer may be programmed to, in response to data indicating an obstruction of the first sensor window, rotate the nozzle about the second axis to the first position. The computer may be further programmed to, in response to data indicating an obstruction of the second sensor window, rotate the nozzle about the second axis to the second position.

The first sensor window may include a first zone and a second zone positioned circumferentially from the first zone relative to the first axis, and the nozzle may be rotatable about the first axis between a first position at which the outlet is aimed at the first zone and a second position at which the outlet is aimed at the second zone. The sensor assembly may further include a computer communicatively coupled to the nozzle, and the computer may be programmed to, in response to data indicating an obstruction of the first zone, rotate the nozzle about the first axis to the first position. The computer may be further programmed to, in response to data indicating an obstruction of the second zone, rotate the nozzle about the first axis to the second position.

The sensor assembly may further include a computer communicatively coupled to the nozzle, and the computer may be programmed to determine a location of an obstruction on the first and second sensor windows, and move the nozzle so that the outlet is aimed at the obstruction by translating the nozzle along the first axis, rotating the nozzle about the first axis, and rotating the nozzle about the second axis.

The outlet may be shaped to eject fluid in a fan pattern.

The sensor assembly may further include a stator extending circumferentially around the first axis, and the nozzle may include a rotor positioned concentrically in the stator.

The sensor assembly may further include a solenoid coil extending circumferentially around the first axis, and the nozzle may include an armature positioned to be magnetically acted upon by the solenoid coil. The sensor assembly may further include a spring extending from a first end fixed relative to the solenoid coil to a second end fixed relative to the armature.

The sensor assembly may further include a computer communicatively coupled to the nozzle, and the computer may be programmed to, in response to data indicating an obstruction of the first or second sensor window, translate the nozzle along the first axis, rotate the nozzle about the first axis, and rotate the nozzle about the second axis.

An angle defined by the first sensor window and the second sensor window may be obtuse.

With reference to the Figures, a sensor assembly 32 for a vehicle 30 includes a first sensor window 34 defining a first plane P1, a second sensor window 36 fixed relative to the first sensor window 34 and defining a second plane P2 different than the first plane P1, and a nozzle 38 positioned to deliver fluid to the first sensor window 34 and second sensor window 36. The nozzle 38 is translatable along a first axis A1, rotatable about the first axis A1, and rotatable about a second axis A2 transverse to the first axis A1.

The sensor assembly 32 provides a simple design and compact packaging that is able to clean multiple sensor windows 34, 36 with a single nozzle 38. The sensor assembly 32 can provide an efficient use of washer fluid by appropriately aiming the nozzle 38 and not using washer fluid for areas of the first sensor window 34 and second sensor window 36 that are not obstructed.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based on data from sensors such as a first sensor 40, a second sensor 42, and a third sensor 44 described below. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 46. The vehicle 30 may be of a unibody construction, in which a frame and a body 46 of the vehicle 30 are a single component. The vehicle 30 may, alternatively, be of a body-on-frame construction, in which the frame supports a body 46 that is a separate component from the frame. The frame and body 46 may be formed of any suitable material, for example, steel, aluminum, etc. The body 46 includes body panels 48 partially defining an exterior of the vehicle 30. The body panels 48 may present a class-A surface, e.g., a finished surface exposed to view by a customer and free of unaesthetic blemishes and defects.

A housing 50 is disposed on one of the body panels 48. For example, the housing 50 can be disposed on a front end of the vehicle 30 below a beltline of the vehicle 30, as shown in FIG. 1. While the discussion below is with respect to a single sensor assembly 32, the vehicle 30 can include multiple sensor assemblies 32, each with one housing 50 disposed on one of the body panels 48. The housings 50 can be arranged to provide the respective sensors 40, 42, 44 with a collective field of view entirely around the front end of the vehicle 30.

Figure 2:
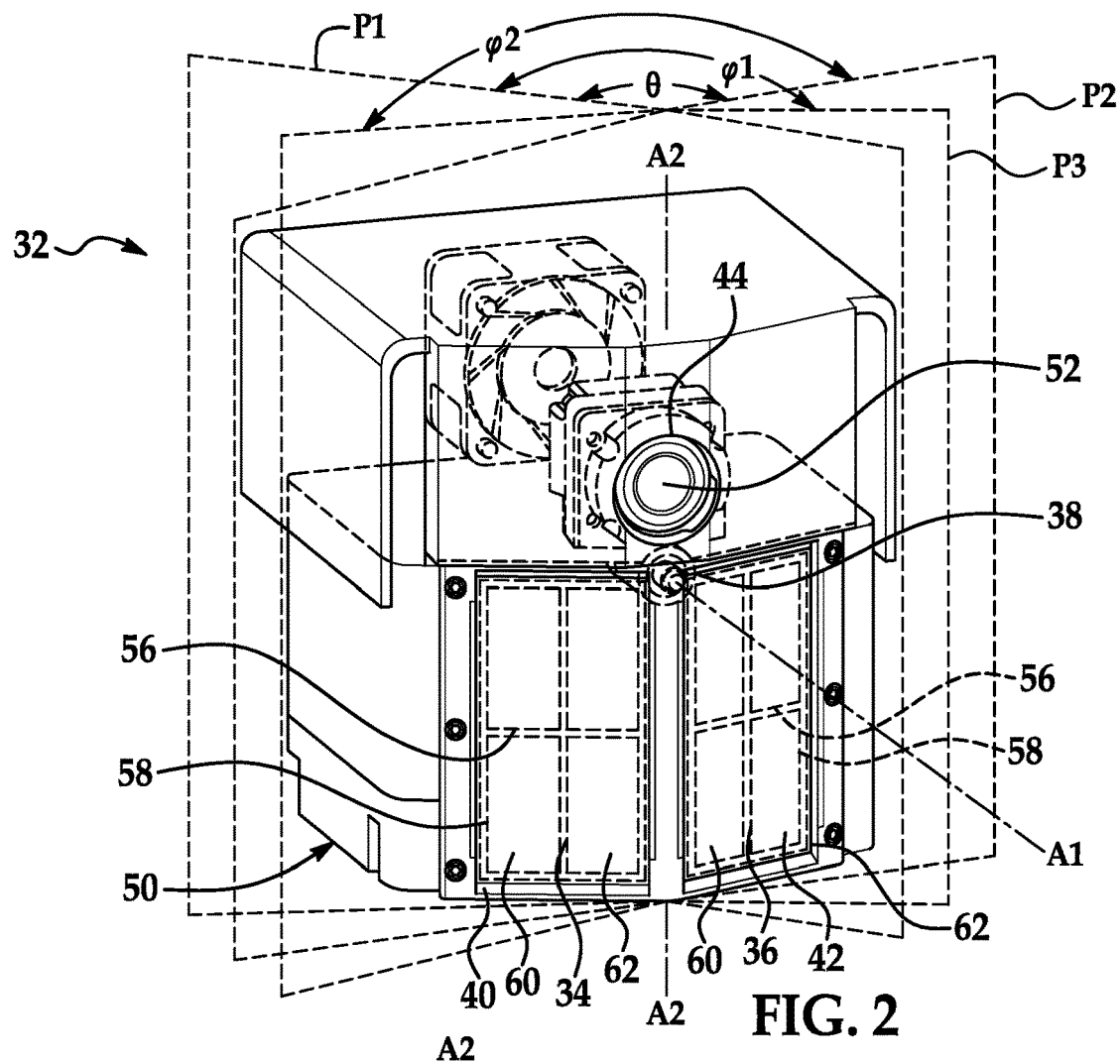
FIG. 2 is a perspective view of a sensor assembly of the vehicle.

With reference to FIG. 2, the first sensor 40 and the second sensor 42 are disposed in the housing 50 and below the third sensor 44. The first sensor 40 and the second sensor 42 are fixed relative to the housing 50 and each other. The first sensor 40 and the second sensor 42 can be disposed laterally from each other with respect to the housing 50.

The first sensor 40 and second sensor 42 detect the external world, e.g., objects and/or characteristics of surroundings of the vehicle 30, such as other vehicles, road lane markings, traffic lights and/or signs, pedestrians, etc. For example, the first sensor 40 and second sensor 42 can be radar sensors, scanning laser range finders, light detection and ranging (LIDAR) devices, or image processing sensors such as cameras. In particular, the first sensor 40 and second sensor 42 can be LIDAR sensors, e.g., scanning LIDAR devices. A LIDAR device detects distances to objects by emitting laser pulses at a particular wavelength and measuring the time of flight for the pulse to travel to the object and back.

The first sensor 40 includes the first sensor window 34, and the second sensor 42 includes the second sensor window 36. The first sensor window 34 and second sensor window 36 are fixed relative to the housing 50 and relative to each other. The first sensor window 34 and second sensor window 36 are positioned below the third sensor 44. The first sensor window 34 and second sensor window 36 extend downward from a plane below the third sensor 44.

The first sensor window 34 has a flat rectangular shape and defines a first plane P1. The second sensor window 36 has a flat rectangular shape and defines a second plane P2 different than the first plane P1. An angle θ defined by the first sensor window 34 and the second sensor window 36, i.e., an angle θ at which the portions of the first plane P1 and the second plane P2 containing the first sensor window 34 and second sensor window 36 intersect, is obtuse.

The third sensor 44 is fixed relative to the housing 50 and disposed inside the housing 50. The third sensor 44 detects the external world, e.g., objects and/or characteristics of surroundings of the vehicle 30, such as other vehicles, road lane markings, traffic lights and/or signs, pedestrians, etc. For example, the third sensor 44 can be a radar sensor, a scanning laser range finder, a light detection and ranging (LIDAR) device, or an image processing sensor such as a camera. In particular, the third sensor 44 can be a camera.

The third sensor 44 includes a third sensor window 52. The third sensor window 52 faces outward from the housing 50, e.g., in a direction between the direction faced by the first sensor window 34 and the direction faced by the second sensor window 36. The third sensor window 52 can be, e.g., a camera lens. The third sensor window 52 defines a third plane P3 orthogonal to a direction in which the third sensor window 52 is aimed. The third plane P3 is different than the first plane P1 and different than the second plane P2. The third plane P3 forms an obtuse angle φ1 with the first plane P1, and the third plane P3 forms an obtuse angle φ2 with the second plane P2.

The nozzle 38 is positioned to deliver fluid to the first sensor window 34, the second sensor window 36, and the third sensor window 52. The nozzle 38 is attached to the housing 50 at a location sufficiently close to each of the sensor windows 34, 36, 52 that the nozzle 38 can deliver fluid to each of the sensor windows 34, 36, 52 by translating along the first axis A1, rotating about the first axis A1, and/or rotating about the second axis A2.

Figure 3:
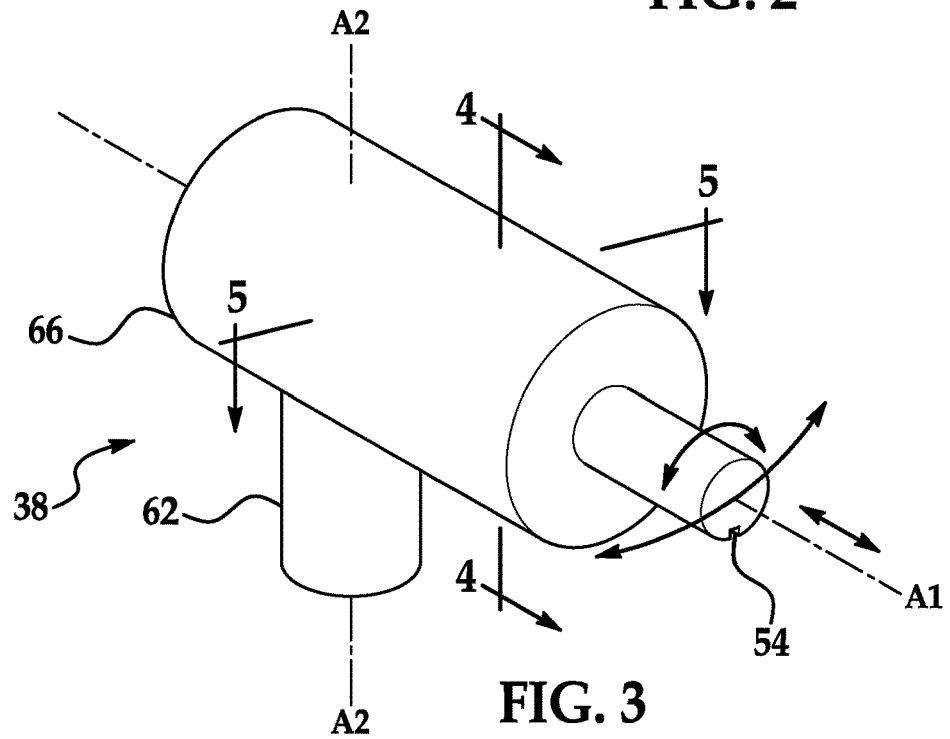
FIG. 3 is a perspective view of a nozzle assembly of the sensor assembly.

With reference to FIG. 3, the nozzle 38 includes an outlet 54 oriented at an acute angle with the first axis A1 in a direction along the first axis A1 toward the housing 50, e.g., toward the first sensor window 34 and second sensor window 36. The nozzle 38 protrudes from the housing 50 away from the housing 50, and the outlet 54 is aimed partially back toward the housing 50. The outlet 54 is shaped to eject fluid in a fan pattern, e.g., dispersion mostly along one dimension circumferentially around the first axis A1.

The nozzle 38 has three degrees of freedom: translation along the first axis A1, rotation about the first axis A1, and rotation about the second axis A2. The second axis A2 is transverse to the first axis A1.

By translating the nozzle 38 along the first axis A1 (i.e., longitudinally moving it along the axis A1), the outlet 54 can be positioned farther or closer to the housing 50. The first sensor window 34 and second sensor window 36 each include a first zone 56 and a second zone 58 farther from the nozzle 38 than the first zone 56, i.e., the second zones 58 are below the first zones 56. The nozzle 38 is translatable along the first axis A1 between a first position at which the outlet 54 is aimed at one of the first zones 56 and a second position at which the outlet 54 is aimed at one of the second zones 58. The outlet 54 is farther from the housing 50 in the second position than in the first position and thus with the outlet 54 at the same acute angle can deliver fluid farther away from the nozzle 38 to the second zone 58. The nozzle 38 is continuously translatable and is not limited to the first position and the second position; the first position and the second position are given as exemplary of the effect of translation.

By rotating about the first axis A1, the outlet 54 can be oriented downward, upward, sideways, or in between. The first sensor window 34 and the second sensor window 36 each include a first zone 60 and a second zone 62 positioned circumferentially from the first zone 60 relative to the first axis A1, e.g., the second zones 62 are rightward from the respective first zones 60 as shown in FIG. 2. The nozzle 38 is rotatable about the first axis A1 between a first position at which the outlet 54 is aimed at the first zone 60 of the first sensor window 34, a second position at which the outlet 54 is aimed at the second zone 62, a third position at which the outlet 54 is aimed at the first zone 60 of the second sensor window 36, a fourth position at which the outlet 54 is aimed at the second zone 62 of the second sensor window 36, and a fifth position at which the outlet 54 is aimed at the third sensor window 52. The positions around the first axis A1 can be dependent on the positions around the second axis A2 described in the next paragraph. The nozzle 38 is continuously rotatable about the first axis A1 for 360° and is not limited to the foregoing positions; the positions are given as exemplary of the effect of rotation about the first axis A1.

By rotating about the second axis A2, the outlet 54 can be moved sideways toward one side or the other of the housing 50. The nozzle 38 is rotatable about the second axis A2 between a first position at which the outlet 54 is aimed at the first sensor window 34 and a second position at which the outlet 54 is aimed at the second sensor window 36. The nozzle 38 is continuously rotatable between extreme positions and is not limited to the first and second positions; the first and second positions are given as exemplary of the effect of rotation about the second axis A2.

The nozzle 38 includes an actuator 64 for rotating the nozzle 38 about the second axis A2. The actuator 64 can be any suitable type for rotating the nozzle 38, e.g., a stepper motor, a rotatable servomechanism, an electric motor, etc. The actuator 64 has one end fixed relative to the housing 50 and another end fixed relative to a shell 66 of the nozzle 38. The actuator 64 rotates the shell 66 relative to the housing 50.

Figure 4:
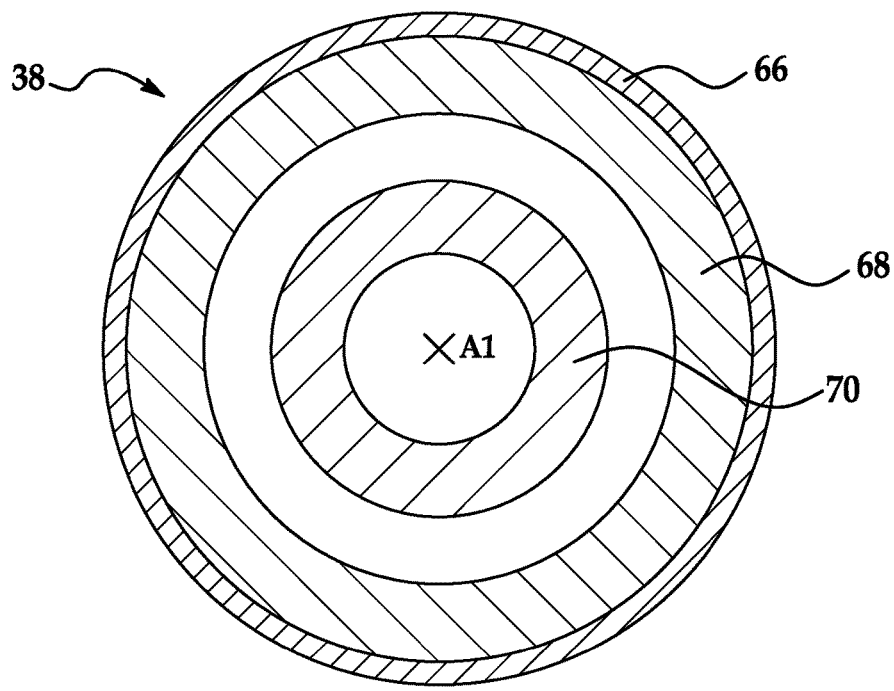
FIG. 4 is a front cross-sectional view of the nozzle assembly.

With reference to FIG. 4, the nozzle 38 includes a stator 68 and rotor 70 for rotating the nozzle 38 about the first axis A1. The stator 68 is positioned inside of and fixed relative to the shell 66, e.g., press fit into the shell 66. The stator 68 extends circumferentially around the first axis A1. The rotor 70 is fixed relative to the outlet 54 of the nozzle 38. The rotor 70 is positioned concentrically in the stator 68 and spaced from the stator 68. The stator 68 and rotor 70 constitute an electric motor, and electricity supplied to the rotor 70 or the stator 68 can cause the rotor 70 to rotate relative to the stator 68, as is known. The stator 68 and rotor 70 can be any suitable type of electric motor, e.g., brushed, brushless, stepper, etc.

Figure 5:
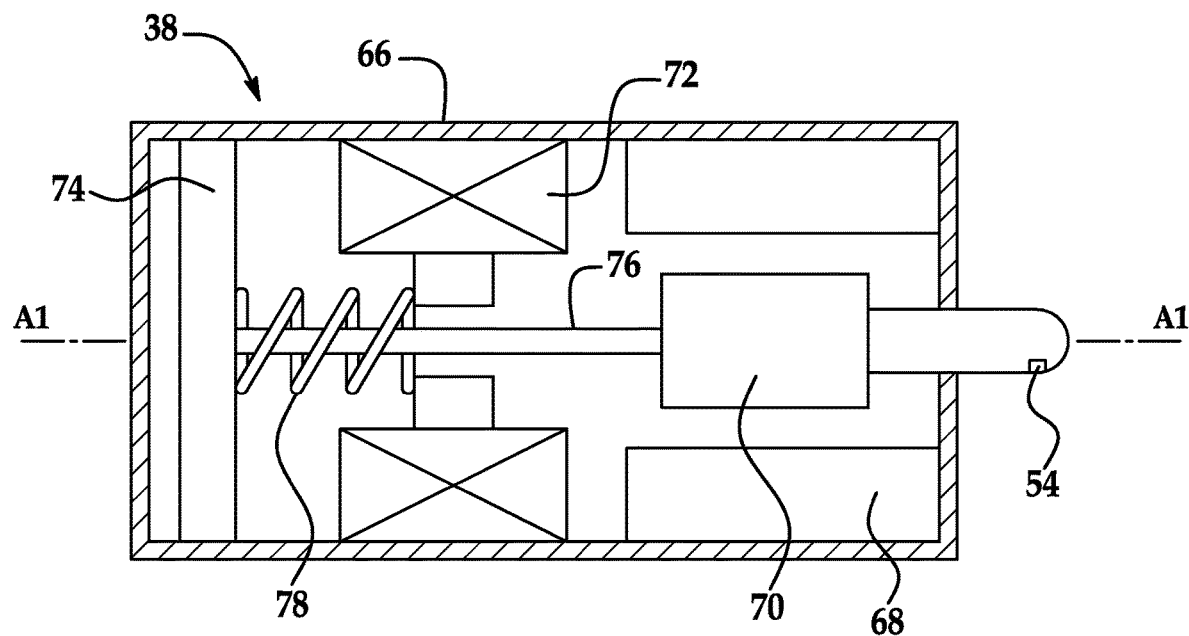
FIG. 5 is a top cross-sectional view of the nozzle assembly.

With reference to FIG. 5, the nozzle 38 includes a solenoid coil 72 and an armature 74 for translating the nozzle 38 along the first axis A1. The solenoid coil 72 is positioned inside and fixed relative to the shell 66, e.g., press fit into the shell 66. The solenoid coil 72 extends circumferentially around the first axis A1. The solenoid coil 72 is a plurality of loops around the first axis A1 through which an electrical current can be generated, thereby generating a magnetic field along the first axis A1. The armature 74 is positioned to be magnetically acted upon by the solenoid coil 72. For example, the armature 74 is centered on the first axis A1 and spaced from the solenoid coil 72. The armature 74 is a material that can be magnetically acted upon, e.g., a metal such as iron. The armature 74 is fixed relative to the outlet 54, e.g., by a rod 76 along the first axis A1. The solenoid coil 72 can move the armature 74 closer to the solenoid coil 72, and thus extend the outlet 54 farther from the housing 50, by generating an attractive magnetic force. The solenoid coil 72 can move the armature 74 away from the solenoid coil 72, and thus retract the outlet 54 closer to the housing 50, by generating a repulsive magnetic force, i.e., reversing polarity. Alternatively or additionally, the nozzle 38 can include a spring 78 extending from a first end fixed relative to the solenoid coil 72 to a second end fixed relative to the armature 74. The solenoid coil 72 can move the armature 74 away from the solenoid coil 72 by reducing the attractive magnetic force so that the force of the spring 78 overcomes the magnetic force, pushing the armature 74 away from the solenoid coil 72

Figure 6:
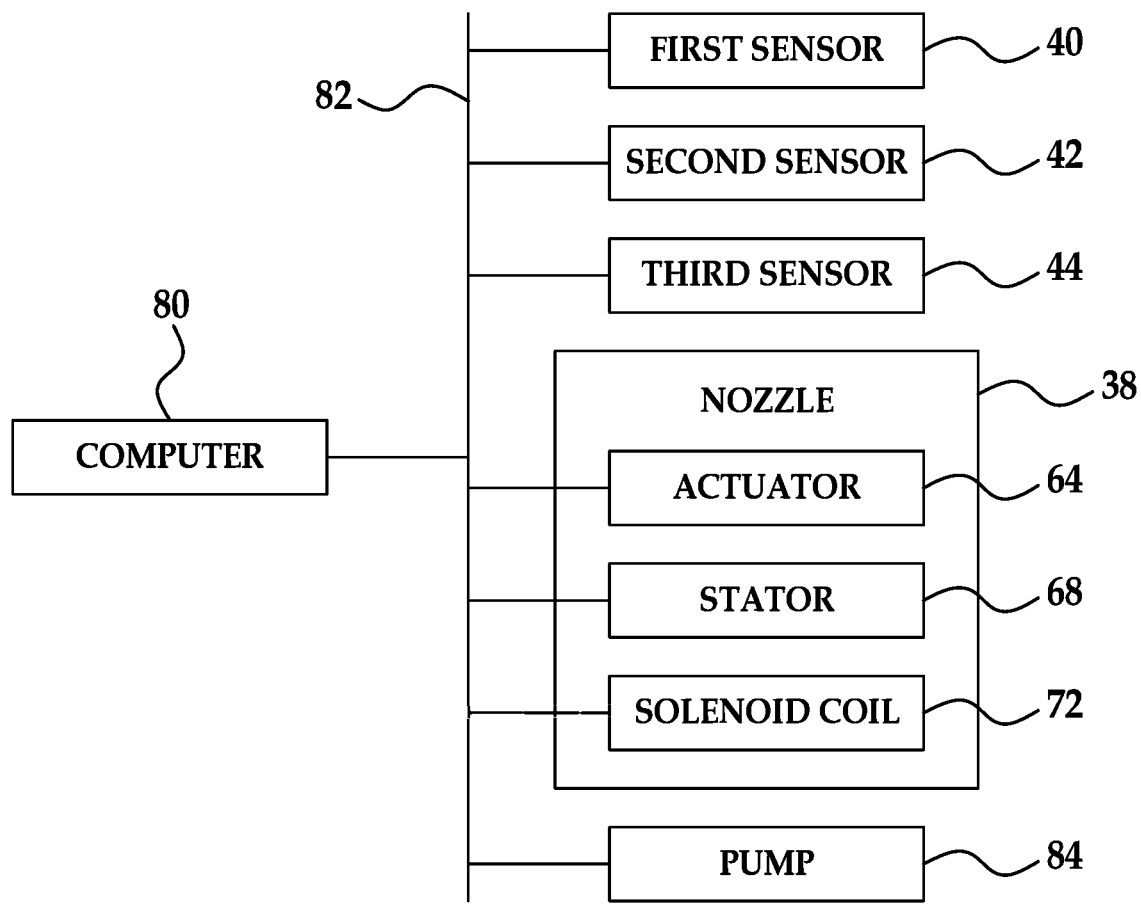
FIG. 6 is a block diagram of a control system for the nozzle assembly.

With reference to FIG. 6, the computer 80 is a microprocessor-based controller. The computer 80 includes a processor, a memory, etc. The memory of the computer 80 includes media for storing instructions executable by the processor as well as for electronically storing data and/or databases.

The computer 80 may transmit and receive data through a communications network 82 such as a controller area network (CAN) bus, Ethernet, WiFi, Local Interconnect Network (LIN), onboard diagnostics connector (OBD-II), and/or by any other wired or wireless communications network. The computer 80 may be communicatively coupled to the sensors 40, 42, 44; the nozzle 38, in particular, the actuator 64, the stator 68, and the solenoid coil 72; a pump 84; and other components via the communications network 82.

The pump 84 is fluidly connected to the outlet 54 and to a reservoir (not shown). The pump 84 can force washer fluid from the reservoir to the outlet 54 with sufficient pressure for the washer fluid to spray out of the outlet 54. The pump 84 can be any suitable type, e.g., positive displacement such as rotary type, reciprocating type, or linear type; velocity; etc.

Figure 7:
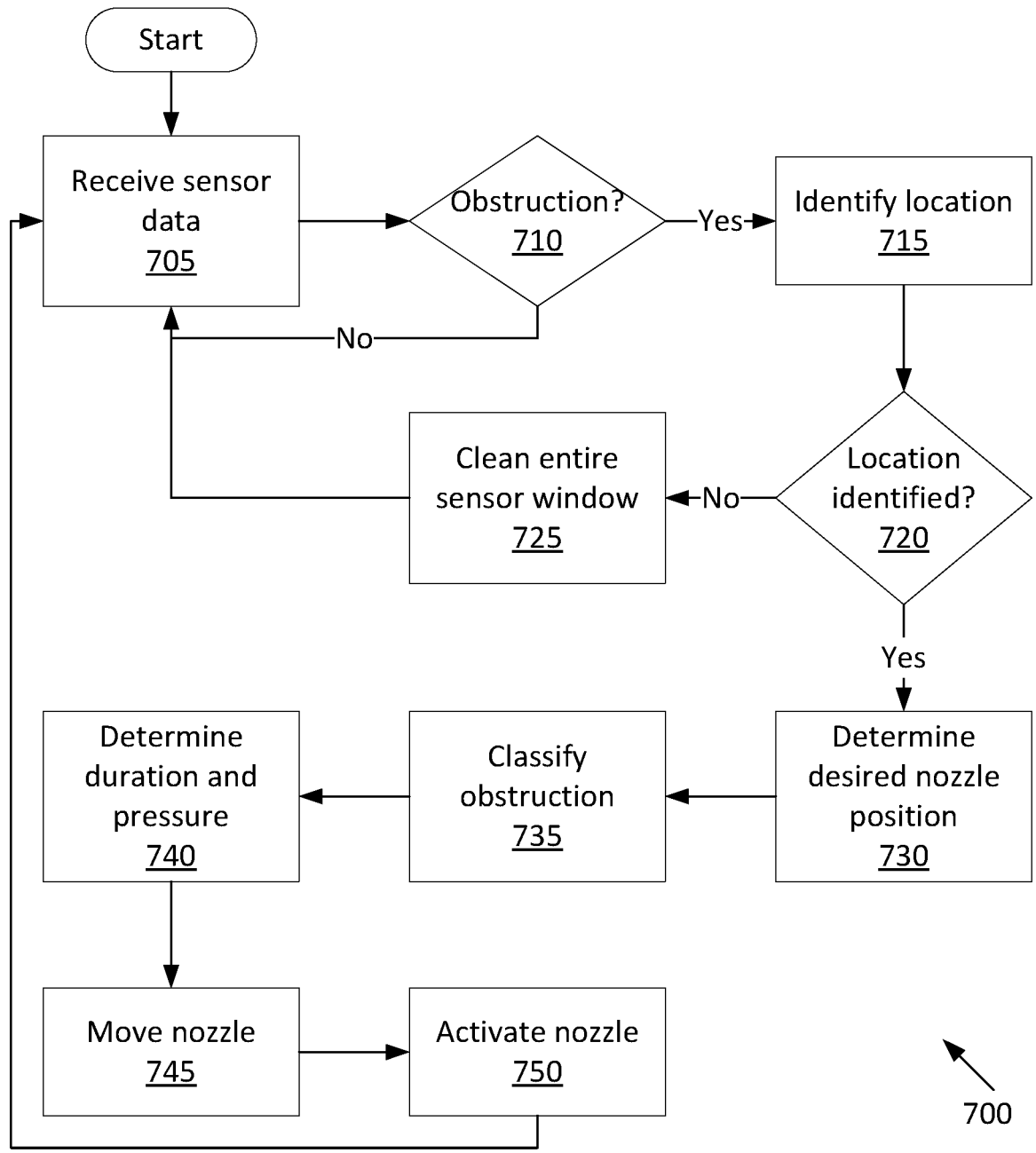
FIG. 7 is a process flow diagram of an example process for controlling the nozzle assembly.

FIG. 7 is a process flow diagram illustrating an exemplary process 700 for controlling the nozzle 38. The memory of the computer 80 stores executable instructions for performing the steps of the process 700. As a general overview of the process 700, in response to an obstruction of one of the sensor windows 34, 36, 52, the computer 80 identifies a location of the obstruction and moves the nozzle 38 using its three degrees of freedom to spray washer fluid at the obstruction, and cleans the entirety of the obstructed sensor window if the location of the obstruction cannot be identified.

The process 700 begins in a block 705, in which the computer 80 receives data from the sensors 40, 42, 44. The computer 80 receives, e.g., LIDAR data from the first sensor 40 and second sensor 42 and image data from the third sensor 44 through the communications network 82. The LIDAR data are a collection of vectors representing distance and direction from the first sensor 40 or second sensor 42 to an object, from which a three-dimensional model of the surrounding environment can be constructed. The image data are a sequence of image frames of the field of view of the third sensor 44. Each image frame is a two-dimensional matrix of pixels. Each pixel has a brightness or color represented as one or more numerical values, depending on the type of third sensor 44. For example, if the sensor is a monochrome camera, each pixel can be a scalar unitless value of photometric light intensity between 0 (black) and 1 (white). For another example, if the third sensor 44 is a full-color camera, the pixels can be values for each of red, green, and blue, e.g., each on an 8-bit scale (0 to 255) or a 12- or 16-bit scale. Position in an image frame, i.e., position in the field of view of the third sensor 44 at the time that the image frame was recorded, can be specified in pixel dimensions or coordinates, e.g., an ordered pair of pixel distances, such as a number of pixels from a top edge and a number of pixels from a left edge of the field of view. Alternatively, the data from the third sensor 44 can be event-based vision, in which each pixel records independently of the other pixels when that pixel senses motion, thus recording more extensively about portions of the field of view experiencing change and recording less about portions of the field of view remaining static.

Next, in a decision block 710, the computer 80 determines whether an obstruction trigger has occurred. An "obstruction trigger" is any data received in the computer 80 that indicates that one of the sensor windows 34, 36, 52 should be cleaned. For example, the computer 80 may receive a user command to perform cleaning of the sensor windows 34, 36, 52 or of another component of the vehicle 30 such as a windshield. For another example, the computer 80 may determine that debris is on one of the sensor windows 34, 36, 52 based on data received from the sensors 40, 42, 44. For example, the computer 80 may determine, e.g., according to known LIDAR-analysis techniques, that a set of directions from the first sensor 40 or second sensor 42 are below a distance threshold or are unchanging over time compared to other directions from the first sensor 40 or second sensor 42, suggesting that a portion of the first sensor window 34 or second sensor window 36 has been covered. The distance threshold may be approximately equal to the distance from a receiver of the first sensor 40 or second sensor 42 to the first sensor window 34 or second sensor window 36, respectively. For another example, the computer 80 may determine, e.g., according to conventional image-analysis techniques, that a set of pixels in image data received from the third sensor 44 is unchanging over time compared to the other of the pixels in the image data, suggesting that a portion of the field of view of the third sensor 44 has been covered. Other algorithms or techniques may be used, e.g., classical computer vision or machine learning algorithms such as convolutional neural networks. In response to the lack of an obstruction trigger, the process 700 returns to the block 705 to continue monitoring for obstructions. In response to an obstruction trigger, the process 700 proceeds to a block 715.

In the block 715, the computer 80 determines a location of an obstruction on one of the sensor windows 34, 36, 52. For example, the computer 80 can determine the portion of the first sensor window 34 or second sensor window 36 that corresponds to the set of directions of the obstruction detected in the decision block 710. For another example, the computer 80 can determine the pixel dimensions with respect to the third sensor window 52 of the obstruction detected in the decision block 710. The computer 80 may fail to determine the location, e.g., if the data indicating the obstruction are insufficiently localized or if the obstruction trigger was something other than an identification of an obstruction in sensor data, e.g., a user command.

Next, in a decision block 720, the computer 80 determines whether the location of the obstruction was determined in the block 715. If the location was not determined, the process 700 proceeds to a block 725. If the location was determined, the process 700 proceeds to a block 730.

In the block 725, the computer 80 moves and activates the nozzle 38 so as to clean substantially the entirety of one of the sensor windows 34, 36, 52 or of all three sensor windows 34, 36, 52, depending on whether or not the obstruction trigger was specific to one of the sensor windows 34, 36, 52. The nozzle 38 can move according to a preprogrammed set of motions, for example, the nozzle 38 can start in the first position about the second axis A2, the first position about the first axis A1, and the first position along the first axis A1; activate the pump 84 while rotating about the first axis A1 from the first position to the second position and then translating along the first axis A1 from the first position to the second position, thereby cleaning substantially all of the first sensor window 34; rotate about the second axis A2 to the second position; activate the pump 84 while rotating about the first axis A1 from the third position to the fourth position and then translating along the first axis A1 from the first position to the second position, thereby cleaning all of the second sensor window 36; and rotating about the first axis A1 to the fifth position and then activating the pump 84, thereby cleaning the third sensor window 52. After the block 725, the process 700 returns to the block 705 to continue monitoring sensor data.

In the block 730, the computer 80 determines the desired positions of the nozzle 38 along the three degrees of freedom based on the location of the obstruction. For example, the computer 80 determines whether the first position or second position around the second axis A2 is desired based on whether the obstruction is on the first sensor window 34 or second sensor window 36; determines whether the first, second, third, fourth, or fifth position around the first axis A1 is desired based on whether the obstruction is on the first zone 60 of the first sensor window 34, the second zone 62 of the first sensor window 34, the first zone 60 of the second sensor window 36, the second zone 62 of the second sensor window 36, or the third sensor window 52; and determines whether the first or second position along the first axis A1 is desired based on whether the obstruction is on the first zone 56 of the first or second sensor window 36 or the second zone 58 of the first or second sensor window 36.

Next, in a block 735, the computer 80 identifies the type of obstruction of the sensor windows 34, 36, 52 based on the data received from the sensors 40, 42, 44 in the block 705. The computer 80 can identify the type of obstruction using conventional image-recognition techniques, e.g., a convolutional neural network programmed to accept LIDAR data or images as input and output an identified type of obstruction. The types of obstructions can include, e.g., water, dirt, mud, dust, crushed insect, live insect, etc. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of obstruction, and the final output is the type of obstruction with the highest score.

Next, in a block 740, the computer 80 determines a duration and pressure for the pump 84 chosen according to the identified type of obstruction. The memory of the computer 80 can store a lookup table of durations and pressures paired with types of obstructions, e.g., the following table:

| Type of Obstruction | Duration [s] | Pressure [kPa] |
|---|---|---|
| Water | 0 | N/A |
| Dirt | 3 | 10 |
| Mud | 2 | 10 |
| Dust | 1 | 5 |
| Crushed insect | 4 | 20 |
| Live insect | 0.2 | 10 |

For example, in response to the type of obstruction being dirt, the computer 80 determines that duration should be three seconds and the pressure should be ten kilopascals. The values in the lookup table are chosen based on experiments with removing different types of obstructions using different pressures and durations.

Next, in a block 745, the computer 80 moves the nozzle 38 so that the outlet 54 is aimed at the obstruction by translating the nozzle 38 along the first axis A1, rotating the nozzle 38 about the first axis A1, and rotating the nozzle 38 about the second axis A2 until the nozzle 38 is at the positions determined in the block 730.

Next, in a block 750, the computer 80 activates the nozzle 38 by instructing the pump 84 to supply washer fluid for the duration and at the pressure determined in the block 740. After the block 750, the process 700 returns to the block 705 to continue monitoring sensor data.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third," "fourth," and "fifth" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
a first sensor window defining a first plane;
a second sensor window fixed relative to the first sensor window and defining a second plane different than the first plane;
a nozzle positioned to deliver fluid to the first and second sensor windows;
wherein the nozzle is translatable along a first axis, rotatable about the first axis, and rotatable about a second axis transverse to the first axis;
a solenoid coil extending circumferentially around the first axis;
the nozzle includes an armature positioned to be magnetically acted upon by the solenoid coil;
wherein the armature is fixed relative to the nozzle and translatable with the nozzle along the first axis when magnetically acted upon by the solenoid coil.

2. The sensor assembly of claim 1, wherein the nozzle includes an outlet oriented at an acute angle with the first axis in a direction along the first axis toward the first sensor window.

3. The sensor assembly of claim 2, wherein the first sensor window includes a first zone and a second zone farther from the nozzle than the first zone, and the nozzle is translatable along the first axis between a first position at which the outlet is aimed at the first zone and a second position at which the outlet is aimed at the second zone.

4. The sensor assembly of claim 3, further comprising a computer communicatively coupled to the nozzle, wherein the computer is programmed to, in response to data indicating an obstruction of the first zone, translate the nozzle along the first axis to the first position.

5. The sensor assembly of claim 4, wherein the computer is further programmed to, in response to data indicating an obstruction of the second zone, translate the nozzle along the first axis to the second position.

6. The sensor assembly of claim 2, wherein the nozzle is rotatable about the second axis between a first position at which the outlet is aimed at the first sensor window and a second position at which the outlet is aimed at the second sensor window.

7. The sensor assembly of claim 6, further comprising a computer communicatively coupled to the nozzle, wherein the computer is programmed to, in response to data indicating an obstruction of the first sensor window, rotate the nozzle about the second axis to the first position.

8. The sensor assembly of claim 7, wherein the computer is further programmed to, in response to data indicating an obstruction of the second sensor window, rotate the nozzle about the second axis to the second position.

9. The sensor assembly of claim 2, wherein the first sensor window includes a first zone and a second zone positioned circumferentially from the first zone relative to the first axis, and the nozzle is rotatable about the first axis between a first position at which the outlet is aimed at the first zone and a second position at which the outlet is aimed at the second zone.

10. The sensor assembly of claim 9, further comprising a computer communicatively coupled to the nozzle, wherein the computer is programmed to, in response to data indicating an obstruction of the first zone, rotate the nozzle about the first axis to the first position.

11. The sensor assembly of claim 10, wherein the computer is further programmed to, in response to data indicating an obstruction of the second zone, rotate the nozzle about the first axis to the second position.

12. The sensor assembly of claim 2, further comprising a computer communicatively coupled to the nozzle, wherein the computer is programmed to determine a location of an obstruction on the first and second sensor windows, and move the nozzle so that the outlet is aimed at the obstruction by translating the nozzle along the first axis, rotating the nozzle about the first axis, and rotating the nozzle about the second axis.

13. The sensor assembly of claim 2, wherein the outlet is shaped to eject fluid in a fan pattern.

14. The sensor assembly of claim 1, further comprising a stator extending circumferentially around the first axis, wherein the nozzle includes a rotor positioned concentrically in the stator.

15. The sensor assembly of claim 1, further comprising a spring extending from a first end fixed relative to the solenoid coil to a second end fixed relative to the armature.

16. The sensor assembly of claim 1, further comprising a computer communicatively coupled to the nozzle, wherein the computer is programmed to, in response to data indicating an obstruction of the first or second sensor window, translate the nozzle along the first axis, rotate the nozzle about the first axis, and rotate the nozzle about the second axis.

17. The sensor assembly of claim 1, wherein an angle defined by the first sensor window and the second sensor window is obtuse.

18. The sensor assembly of claim 1, further comprising a computer communicatively coupled to the nozzle, wherein the computer is programmed to, in response to data indicating an obstruction of the first or second sensor window, determine a location of the obstruction on the first or second sensor window, and in response to failing to determine the location of the obstruction, move and activate the nozzle so as to clean substantially an entirety of the first or second sensor window.

19. The sensor assembly of claim 16, wherein translating the nozzle along the first axis includes translating the nozzle to one of a plurality of discrete positions along the first axis, rotating the nozzle about the first axis includes rotating the nozzle to one of a plurality of discrete positions around the first axis, and rotating the nozzle about the second axis includes rotating the nozzle to one of a plurality of discrete positions around the second axis.

20. The sensor assembly of claim 19, wherein the computer is further programmed to determine a location of the obstruction within a plurality of discrete zones on the first and second sensor windows, and a choice of the discrete positions is based on the zone in which the obstruction is located.

* * * * *